US008894886B1

(12) United States Patent
Luhrs et al.

(10) Patent No.: US 8,894,886 B1
(45) Date of Patent: Nov. 25, 2014

(54) REDUCTIVE-EXPANSION SYNTHESIS OF GRAPHENE

(75) Inventors: Claudia Catalina Luhrs, Rio Rancho, NM (US); Jonathan Phillips, Rio Rancho, NM (US)

(73) Assignee: STC.UNM, Albuquerque, NM (US)

( * ) Notice: Subject to any disclaimer, the term of this patent is extended or adjusted under 35 U.S.C. 154(b) by 232 days.

(21) Appl. No.: 13/040,976

(22) Filed: Mar. 4, 2011

Related U.S. Application Data

(60) Provisional application No. 61/339,502, filed on Mar. 5, 2010.

(51) Int. Cl.
*C01B 31/04* (2006.01)

(52) U.S. Cl.
USPC ..................................... 252/378 R; 423/448

(58) Field of Classification Search
USPC ..................................... 423/448; 252/378 R
See application file for complete search history.

(56) References Cited

U.S. PATENT DOCUMENTS

| | | | | | |
|---|---|---|---|---|---|
| 3,404,061 | A | * | 10/1968 | Bochman et al. | 428/143 |
| 5,376,609 | A | * | 12/1994 | Guile | 502/62 |
| 2010/0140792 | A1 | * | 6/2010 | Haddon et al. | 257/713 |

OTHER PUBLICATIONS

Nethravathi, et al., Delamination, colloidal dispersion and reassembly of alkylamine intercalated graphite oxide in alcohols, Carbon 2006; 44: 2635-2641.*
Wang, et al., Ternary Self-Assembly of Ordered Metal Oxide-Graphene Nanocomposites for Electrochemical Energy Storage, ACS Nano 2010; 4(3): 1587-1595.*
Wakeland, et al., Production of graphene from graphite oxide using urea as expansion-reduction agent, Carbon 2010; 48: 3463-3470.*
Hong et al., "Preparation of Gold Nanoparticle/Graphene Composites with Controlled Weight Contents and Their Application in Biosensors", J Phys Chem C., Feb. 2010, 114(4):1822-6.
Schedin et al., Detection of Individual Gas Molecules Adsorbed on Graphene, Nat Mater, Sep. 2007, 6(9): 652-5.
Frank et al., "Mechanical properties of suspended graphene sheets", J Vac Sci Technol B, Nov. 2007, 25 (6)2558-61.
Cho et al., "Dynamic mechanical and thermal properties of phenylethynyl-terminated polymide composites reinforced with expanded graphite nanoplatelets", Macromol Mater Eng., Mar. 2005, 290(3):179-87.
Ansari et al., "Functionalized Graphene Sheet-Poly(vinylidene fluoride) Conductive Nanocomposites", J Polym Sci Pt B-Polym Phys., May 2009, 47(9):888-97.
Stankovich et al., "Graphene-based composite materials", Nature, Jul. 2006, 442(7100):282-6.
Stoller et al., "Graphene-Based Ultracapacitors", Nano Letters, Oct. 2008, 8(1):3498-502.

Yong et al., "Theoretical Efficiency of Nanostructured Graphene-Based Photovoltaics", Small, Jan. 2010, 6(2):313-8.
Liang et al., "Graphene-based electrode materials for rechargeable lithium batteries", J Mater Chem., 2009, 19(33): 5871-8.
Guo et al., "Three-Dimensional Pt-on-Pd Bimetallic Nanodendrites Supported on Graphene Nanosheet: Facile Synthesis and Used as an Advanced Nanoelectrocatalyst for Methanol Oxidation", ACS Nano, Jan. 2010, 4(1):547-55.
Liu et al., "Organic Photovoltaic Devices Based on Novel Acceptor Material: Graphene", Advanced Materials, Oct. 2008, 20(20):3924.
Wei et al, "Synthesis of N-Doped Graphene by Chemical Vapor Deposition and Its Electrical Properties", Nano Lett., May 2009, 9(5):1752-8.
Dato et al., "Substrate-free gas-phase synthesis of graphene sheets", Nano Lett., Jul. 2008, 8(7):2012-6.
McAllister et al., "Single Sheet Functionalized Graphene by Oxidation and Thermal Expansion of Graphite", Chem. Mater., 2007, 19:4396-404.
Schniepp et al., "Functionalized Single Graphene Sheets Derived from Splitting Graphite Oxide", The Journal of Physical Chemistry B Letters, Apr. 2006, 110:8535-9.
Gass et al., "Free-standing graphene at atomic resolution", Nature Nanotechnology, Nov. 2008, 3(11):876-81.
Dreyer et al., "The chemistry of graphene oxide", Chem Soc Rev., 2010, 39(1):228-40.
Ju et al., Structures of thermally and chemically reduced graphene, Mater Lett., Feb. 2010, 64(3):357-60.
Jung et al., "Effect of Water Vapor on Electrical Properties of Individual Reduced Graphene Oxide Sheets", J Phys Chern C., Dec. 2008, 112(51):20264-8.
Stankovich et al., "Synthesis of Graphene-based Nanosheets via Chemical Reduction of Exfoliated Graphite Oxide", Carbon, 2007; 45:1558-65.
Stankovich et al., "Stable aqueous dispersions of graphitic nanoplatelets via the reduction of exfoliated graphite oxide in the presence of poly(sodium 4-styrenesulfonate)", J Mater Chem., 2006, 16(2):155-8.
Wang et al., "Facile synthesis and characterization of graphene nanosheets", J Phys Chem C., Jun. 2008, 112(22): 8192-5.
Zhang et al., "Improving gas sensing properties of graphene by introducing dopants and defects: a first-principles study," Nanotechnology 20 (2009), 185504 (pp. 1-8).
Viculis et al., "Intercalation and exfoliation routes to graphite nanoplatelets," Journal of Materials Chemistry, 2005, 15, pp. 974-978.
D.D.L. Chung, "Review Exfoliation of Graphite", Journal of Material Science (22), 1987, pp. 4190-9148.

* cited by examiner

*Primary Examiner* — Daniel C McCracken
(74) *Attorney, Agent, or Firm* — MH2 Technology Law Group, LLP

(57) ABSTRACT

Exemplary embodiments provide materials and methods for forming graphene-based exfoliated products with low oxygen contents by a reductive-expansion reaction from a physical mixture containing graphite-based precursor(s) and a chemical agent. Exemplary embodiments also provide materials and methods for forming graphene-based exfoliated products with controllable amounts of nitrogen and/or other impurities incorporated in the material structure as a result of a reductive-expansion reaction from a physical mixture containing graphite-based precursor(s) and a chemical agent.

20 Claims, No Drawings

REDUCTIVE-EXPANSION SYNTHESIS OF GRAPHENE

DESCRIPTION OF THE INVENTION

Related Applications

This application claims priority to U.S. Provisional Patent Application Ser. No. 61/339,502,filed Mar. 5, 2010, which is hereby incorporated by reference in its entirety.

GOVERNMENT RIGHTS

This invention was made with Government support under Grant No. DE-AC52-06NA25396 DOE/NNSA awarded by Los Alamos National Laboratory. The U.S. Government has certain rights in the invention.

BACKGROUND

Graphene is considered a two dimensional structure equivalent to individual graphite sheets or an open carbon nanotube. A single graphene sheet has a theoretical surface area higher than 2500 $m^2$/g, higher than that of activated carbon. However, the term graphene is generally understood to encompass any graphite structure with fewer than about 10 basal plane layers. Basal planes are those layers in which carbon atoms are bound together by covalent bonds.

Graphene's unique properties include: the mechanical strength inherent in the strong covalent bond between adjoining carbon atoms in a basal plane, the potential to organize graphene to create 'molecular scale' circuit elements, and the unique chemistry of the 'edges' of the graphene sheet. Exemplary applications that use all or some of these properties include: I. Graphene used as gas and bio-sensors, either as pristine, B- or N-doped, due to the dramatic changes on its structural and electronic properties when molecules are absorbed (see Hong et al., J. Phys. Chem. C. 2010 February; 114(4): 1822-6; Zhang, et al., Nanotechnology 2009 May; 20(18): 8; and Schedin et al. Nat. Mater. 2007 September; 6(9): 652-5); II. Graphene used as resonator materials due to its thermal conductivity, mechanical properties (e.g., strength and stiffness), and tunable electrical properties (see Frank et al., J. Vac. Sci. Technol. B. 2007 November; 25(6): 2558-61); III. Graphene used as filler material for reinforcing polymers or for generating conductive polymers (see Cho et al., Macromol. Mater. Eng. 2005 March; 290(3): 179-87;Ansari et al., J. Polym. Sci. Pt. B-Polym. Phys. 2009 May; 47(9): 888-97; and Stankovich at al., Nature 2006 July; 442(7100): 282-6). For example, composites made from electrospun polymer nanofibers containing graphene nanoplatelets provide improved Young's modulus (see Viculis et al., J. Mater. Chem. 2005; 15(9): 974-8); and IV. Graphene used for supercapacitor electrodes due to its high electrical conductivity, which improves performance over a wide range of voltage scan rates (see Stoller et al., Nano Lett, 2008 October; 8(10): 3498-502). Additionally, battery, fuel cell and solar cell components based on graphene are an example on how this material is making its way through multiple energy related applications, including both energy generation and storage (see Yong et al., Small. 2010 January; 6(2): 313-8;Liang et al., J. Mater. Chem. 2009; 19(33): 5871-8; Guo et al., ACS Nano. 2010 January; 4(1):547-55; and Liu et al., Advanced Materials. 2008 October; 20(20): 3924).

Conventional methods for producing graphene include chemical vapor deposition (CVD) and related methods that generate graphene free-standing sheets (see Wei et al., Nano Lett. 2009 May; 9(5): 1752-8;and Dato et al., Nano Lett. 2008 July; 8(7): 2012-6), thermal exfoliation of graphite oxide (see McAllister et al., Chem. Mater. 2007; 19: 4396-404; Schniepp et al., J. Phys. Chem. B. 2006 April; 110: 8535-9; and Gass et al., Nat. Nanotech. 2008 November; 3(11): 676-81), and wet chemistry reduction techniques that employ graphite oxide as precursor and liquid reducing agents such as hydrazine and additives to eliminate oxygen group (see Dreyer et al., Chem. Soc. Rev. 2010; 39(1): 228-40; Ju et al., Mater. Lett. 2010 February; 64(3): 357-60;Jung et al., J. Phys. Chem. C. 2008 December; 112(51): 20264-8; Stankovich et al., Carbon 2007; 45: 1558-65;Stankovich et al, J. Mater. Chem. 2006; 16(2): 155-8; and Wang et al., J. Phys. Chem. C. 2008 June; 112(22): 8192-5). However, none of these conventional processes can be readily scaled up to manufacture large quantities of graphene.

Thus, there is a need to develop methods of forming graphene-based products in massive amounts. It is also desirable to provide methods that are rapid, inexpensive, and easy to scale up for forming graphene-based products.

SUMMARY

According to various embodiments, the present teachings include a method of forming a graphene-based product. The graphene-based product can be formed by first forming a physical mixture and then heating the physical mixture in an inert atmosphere. The physical mixture can be formed by mixing one or more graphite-based precursors, which include a graphite oxide and/or an expandable graphite, with a chemical agent that produces a reducing gas upon thermal decomposition. The resulting graphene-based product can include one or more of a single graphene sheet, a stack of two or more single graphene sheets, and/or entangled single graphene sheets.

According to various embodiments, the present teachings also include a method of forming a graphene-based product. In this method, a physical mixture can be formed by physically mixing graphite oxide with a reductive-expansion agent that includes urea. Each of the one or more graphite-based precursors can include a graphite oxide, and/or an expandable graphite. The physical mixture can then be heated in an inert atmosphere at a heating temperature to form a free-standing graphene-based product. The heating temperature can be at or above a decomposition temperature of the reductive-expansion agent. Following the heating process, the free-standing graphene-based product can be cooled and can include one or more of a single graphene sheet, a stack of two or more single graphene sheets, and entangled single graphene sheets.

It is to be understood that both the foregoing general description and the following detailed description are exemplary and explanatory only and are not restrictive of the present teachings, as claimed.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for forming graphene-based products. The graphene-based products can be formed by a thermal expansion and de-oxygenation (i.e., reduction) reaction, which is also referred to herein as a reductive-expansion reaction or expansion-reduction reaction, from a physical mixture containing graphite-based precursor(s) and a chemical agent. The resulting graphene-based products can include, but are not limited to, a single graphene sheet, a stack of two or more single graphene sheets, entangled graphene sheets, and/or mixtures thereof. Exemplary embodiments also provide materials and methods for forming graphene-based exfoliated products with low amounts of nitrogen and/or other atomic species impurities incorporated in the material structure as a result of a reductive-expansion reaction from a physical mixture containing graphite-based precursor(s) and a chemical agent. Other possible impurities can include, but are not limited to, metals such as noble metals, transition metals, alkaline earth metals, and/or alkali metals, and/or semiconductors including, e.g., Ge, Si, or As.

As used herein, the term "graphitic" or "graphite" refers to a three dimensionally (3D) ordered array of carbon atoms with planar sheets of arrayed atoms stacked in a defined, repeating pattern. As used herein, the term "graphene" or "graphene sheet" or "single graphene sheet" refers to one or a few (e.g., about 10 or less) atomic monolayers of $sp^2$-bonded carbon atoms.

As used herein, the term "graphite-based precursor" refers to any graphite-based compounds that can be processed to form the disclosed graphene-based products by a reductive-expansion reaction. Specifically, the graphite-based precursor(s) can include, but are not limited to, oxygenated solid graphite-based compounds, such as graphite oxide, and/or intercalated un-oxidized graphite-based compounds, such as expandable graphite where molecules in between the graphene sheets can produce a thermal expansion.

As used herein, the term "graphite oxide" or "GO" refers to a material that primarily contains graphitic carbon, but also contains oxygen groups and hydrogen in different ratios. The oxygen groups are attached to the graphene/graphite sheets and cause a separation between graphitic layers. This separation can be followed by an exfoliation of the sheets when the oxygen containing groups are lost as a result of rapid thermal treatments or other means of reduction-exfoliation. In one example, graphite oxide (or GO) can be made by reacting graphite with an oxidizer following Hummers method or modifications of such method. The Hummers method is described in Journal of the American Chemical Society, 1958; 80(6):1339, entitled "Preparation of Graphitic Oxide," which is hereby incorporated by reference in its entirety. In some cases, the term "graphite oxide" can be used interchangeable with the term "graphene oxide."

To form the exemplary graphene-based products, a physical mixture can be formed by mixing graphite-based precursor(s) with chemical agent(s) that produces reducing gas(es) upon thermal decomposition. The chemical agent can also be referred to as a reductive-expansion agent. In an embodiment, the reductive-expansion agent, also referred to herein as a reduction-expansion agent or reduction-expansion chemical agent, is a solid material that decomposes upon heating to release reducing gases. The chemical agent can include, but is not limited to, one or more nitrogen-hydrogen-containing (i.e., N-H containing) molecules including, for example, urea $[(NH_2)_2CO]$, thiourea $[SC(NH_2)_2]$, and/or other compounds containing a group of -NH, -NH$_2$, and/or other similar groups. The exemplary urea can be thermally decomposed to produce biuret, cyanuric acid, ammelide, ammelide, $(HNCO)_x$, $NH_3$, and diverse polymeric substances, depending on reaction conditions. The thermal decomposition of urea in inert atmospheres can occur at moderate temperatures.

In embodiments, the physical mixture can include a molar ratio of the graphite-based precursor(s) to the chemical aaent(s), where the molar ratio, based on smallest repeat unit of the precursor, can range from about 1:100 to about 100:1. In certain embodiments, the molar ratio of exemplary graphite oxide precursor to urea can be between about 1:1.5 to about 1:10. In embodiments, the molar ratio is not limited.

The physical mixture can be formed by mixing the graphite-based precursor(s) with the chemical agent(s) as a solid mixture. The solid mixture can then be ground. In embodiments, the physical mixture can be formed by first forming a chemical agent-containing solution by dissolving the chemical agent in a solvent. The chemical agent-containing solution can then be mixed with the graphite-based precursor(s), followed by a drying process. The dried, solid mixture can thus include the graphite-based precursor(s) and the chemical agent(s). Alternatively, the drying process can be conducted during the subsequent heating process.

In embodiments, impurity materials that contain at least one impurity atomic species, in its pure form and/or as an element in a compound material, can be physically mixed with the mixture of graphite-based precursor(s) and the chemical agent(s). Such impurity atomic species can include, but is not limited to, any metals including, e.g., a noble metal, a transition metal, an alkaline earth metal, and/or an alkali metal, and/or any semiconductor materials including, e.g., silicon, germanium, or arsenic. The final graphene-based product can then include the impurity atomic species in a controllable amount, for example, of about 30% or less by weight of the total product.

The formed physical mixture can then be heated in an inert atmosphere to form the araphene-based product(s). In embodiments, the inert atmosphere can be provided by using, one or more chemically inert or oxygen-free gases including, but not limited to, $N_2$, Ar, He, or a combination thereof. In embodiments, prior to the heating process, the physical mixture can be formed in an inert atmosphere using the chemically inert gases.

The heating temperature for heating the physical mixture can be at or above a decomposition temperature of the chemical agent. For example, when urea is used as an exemplary chemical agent, it can decompose in stages, starting at approximately 300° C. and ending at about 600° C. In embodiments, the heating temperature for the physical mixture can be less than about 600° C. or higher, which is lower than conventional temperatures used to form graphene from thermal exfoliation processes and is sufficient to remove most oxygen groups from GO when compared with conventional exfoliation routes. The resulting graphene-based products obtained from the disclosed reductive-expansion method can have lower oxygen concentration (e.g., about 2-4% of oxygen) as compared with the products from conventional thermal exfoliation (e.g., about 8-15% or higher of oxygen in the conventional products).

The physical mixture can be heated for a short period of time. In one example, the physical mixture can be placed in an oven or other devices pre-heated at the heating temperature for about 5 minutes or less. in another example, the physical mixture can be placed in an oven or other devices that is then heated from room temperature to the heating temperature for about 30 minutes or less. In embodiments, the time length for heating is not limited.

Following the heating process, the formed graphene-based product(s) can be cooled to room temperature under the inert atmosphere and can then be collected. For example, the graphene-based product(s) can be readily collected as free-standing, i.e., no need of substrates. The formed graphene-based product(s) can be, for example, a single graphene sheet and/or overlapping or entangled sheets of single graphene. In embodiments, the size of the graphene-based product(s) can be in the nano-scale. The graphene-based product(s) can have a carbon content of at least about 90% by weight. The graphene-based product can have minimum oxygen content, for example, less than about 8%, or less than about 5%, or less than about 2% by weight.

In this manner, high quality free standing graphene-based product(s) can be formed in large or small quantities within a short time period and using simple equipment. In embodiments, the high quality graphene-based product(s) can have high surface area and high volume-to-weight ratio.

The following examples primary relate to formation of graphene-based products from an exemplary physical mixture containing graphite oxide and urea in accordance with various embodiments of the present teachings. The following examples are not to be taken as limiting the disclosure or claims in any way.

EXAMPLES

Example 1: Preparation of Graphite Oxide (GO) Precursor

GO was used as an exemplary graphite-based precursor and was prepared using graphite flakes (Sigma-Aldrich, Saint Louis, Mo.), sulfuric acid (EMD Chemicals Inc, Gibbstown, N.J.), potassium permanganate (J. T. Baker, Phillipsburg, N.J.), sodium nitrate (EMD Chemicals Inc, Gibbstown, N.J.), and hydrogen peroxide (EMD Chemicals Inc, Gibbstown, N.J.), by Hummers method as described above, which is hereby incorporated by reference in its entirety.

Example 2: Preparation of GO-Urea Mixture

A GO-urea mixture, having GO: urea molar ratios of 1:1 and 1:2, was prepared by mixing graphite oxide (GO) prepared from Example 1 with urea (Sigma-Aldrich, Saint Louis, Mo.) as a solid mixture and ground in an agate mortar.

Example 3: Preparation of GO-Urea Mixture

A GO-urea mixture, having. GO: urea molar ratios of 1:1 and 1:2, was prepared by first dissolving urea in a water-ethanol solvent to form a urea solution, and mixing the prepared GO from Example 1 with the urea solution. The GO-urea-solution mixture was then freeze dried to form GO-urea solid mixture before performing the heat treatment.

Example 4: Preparation of Graphene

The GO-urea mixture obtained from Examples 2 and/or 3 was then placed in a ceramic boat and introduced into a quartz tube of a tubular furnace (Lindberg Blue from Thermo Scientific, Waltham, Mass.). $N_2$ (UHP, ultra high purity) gas was introduced there-into at a flow rate of about 105 sccm (i.e., cubic centimeters per minute) during the thermal or heat treatment. The furnace temperature was then raised to the reaction temperature of, e.g., about 600° C. and 800° C. The temperatures were selected to be above urea thermal decomposition temperature. Reaction times were varied between about 5 and 30 minutes. After the reaction temperature and dwell times were reached, power to the heaters was turned off and the sample was allowed to cool to room temperature.

Example 5: Preparation of Graphene

In this example, the tubular furnace was first heated to the reaction temperature (e.g., about 600° C. or 800° C.), while the GO-urea mixture obtained from Examples 2 and/or 3 was placed in a ceramic boat inside a quartz tube with a $N_2$ flow of about 105 sccm outside the furnace. Once the reaction temperature was reached, the GO-urea mixture sample was placed inside the furnace for about 5 minutes. Sample was then retrieved and left to cool.

In this manner, treating samples including graphite oxide and urea in inert atmospheres (i.e. $N_2$) above the urea decomposition temperature led to both a significant volume expansion and chemical reduction. The volumetric change occurred as the urea decomposed and volatile material from the same caused an exfoliation effect in the graphite oxide layers. The volume expansion was visually observed when the cooled sample was retrieved from furnace. SEM (i.e., scanning electron microscope) and TEM (i.e., transmission electron microscopy) observations of the generated products indicated that the process was not only evident at a macroscopic level but produced an exfoliation of layers at a nano-scale. The graphite oxide reduction process to eliminate oxygen species from graphite oxide to render graphene occurred simultaneously, aided by the temperature employed and the reducing nature of urea decomposition products.

A $sp^2$ graphitic structure was generated, including extended thin graphene films that curved and reached tens of microns in length, and/or entangled/overlapping graphene sheets. For example, overlapping sheets of thin graphene and extended thin graphene layers were prepared from the reaction of graphite oxide with urea at 600° C., wherein no solvents were involved in the sample preparation. Samples produced at higher temperatures (ca. 800° C.) showed similar morphological characteristics than the ones generated at 600° C. Synthesis carried out for short periods of time, for example, about 5 minutes, presented extended general evidence of exfoliation and sample reduction. Nitrogen content in graphene samples produced from an exemplary physical mixture containing GO: Urea molar ratio of 1:1 were found to be approximately 1.8%, while graphene formed from molar ratio of 1:2 (urea 2x) contained about 4.8% nitrogen. Oxygen content was found to be about 36% for original GO, about 2.6% for GO treated with urea having a GO: urea molar ratio of 1:2; and about 0.6% for GO: urea molar ratio of 1:1.

The reductive-expansion method presented herein not only produced exfoliated sheets of graphene with highly reduced amounts of oxygen, it also introduced diverse amounts of nitrogen or other possible impurities in the structure of graphene. The final nitrogen content in the resulting graphene-based product depended on amounts of urea and synthetic conditions of procedure. Nitrogen doping of graphene, e.g., of about 0.1% nitrogen or more by weight, formed by this method can cause a change in the material's electrical properties. Other possible impurities can include, but are not limited to, metals such as noble metals, transition metals, alkaline earth metals, and/or alkali metals, and/or semiconductors including, e.g., Ge, Si.

Control experiments. In order to determine the role of urea in the process and differentiate the disclosed reductive-expansion synthesis from those that conventionally involve simple thermal exfoliation, GO samples without urea were heated in $N_2$ atmospheres in diverse conditions and at variable heating rates. In all cases, exfoliated samples without urea presented oxygen contents larger than 8%, even for heating treatments above 1000° C.

Using urea to mediate reductive-expansion process of GO to generate graphene-based products provided many advantages. For example, the temperature for decomposition and emission of reducing gases from urea is much lower (e.g., below 600° C.) than the temperature used for conventional thermal exfoliation of graphite oxide, usually at 1050° C., giving a this method an advantage for mass production of graphene. In addition, use of urea exacerbates the gas evolution process at a broader window of heating protocols while the reducing species from its decomposition aid removal of the oxygen groups, providing graphene samples with lower oxygen contents as compared with conventional thermal exfoliation processes. Also, the disclosed process permits control of nitrogen content of the product simply by varying the ratio of urea to GO. Further, the disclosed process is based on technology that uses harmless and inexpensive reagents that are widely available in large quantities. The use of urea as a reductive- expansion agent generates finely divided carbon nanostructures with adequate characteristics for the applications that graphene has been envisioned. Even further, the disclosed process is easy to scale up, in a rapid and inexpensive fashion. Furthermore, because the disclosed graphene-based products are formed from heating a solid mixture, no additional steps, for example, to remove solvents or stabilizers from conventional colloidal routes, are needed.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. -1, -1.2, -1.89, -2, -2.5, -3, -10, -20, -30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming a graphene-based product comprising:
   forming a solid phase, physical mixture comprising one or more graphite-based precursors and one or more solid phase reduction-expansion chemical agents selected from the group consisting of urea [$(NH_2)_2CO$] and thiourea [$SC(NH_2)_2$], wherein each of the one or more graphite-based precursors comprises one or more of a graphite oxide, an expandable graphite, and a combination thereof; and
   heating the physical mixture in an inert atmosphere at a temperature sufficient to thermally decompose the solid phase reduction-expansion chemical agent to produce a reducing gas and form a graphene-based product comprising one or more of a single graphene sheet, a stack of two or more single graphene sheets, entangled single graphene sheets, and combinations thereof.

2. The method of claim 1, wherein the physical mixture comprises a molar ratio of the one or more graphite-based precursors to the chemical agent, wherein the molar ratio ranges from about 1:100 to about 100:1.

3. The method of claim 1, wherein the step of forming a physical mixture comprises:
   mixing the one or more graphite-based precursors with the solid phase reduction-expansion chemical agent as a solid mixture.

4. The method of claim 1, wherein the step of forming a physical mixture comprises:
   forming a chemical agent-containing solution by dissolving the solid phase reduction-expansion chemical agent in a solvent,
   mixing the chemical agent-containing solution with the one or more graphite-based precursors, and
   drying the mixture containing the chemical agent and the one or more graphite-based precursors during or prior to the heating step.

5. The method of claim 1, wherein the temperature ranges from about 300° C. to about 800° C., the temperature being sufficient to result in a reductive-expansion process of the one or more graphite-based precursors.

6. The method of claim 1, wherein the step of heating the physical mixture comprises placing the physical mixture in a pre-heated device at a heating temperature.

7. The method of claim 1, wherein the step of heating the physical mixture comprises placing the physical mixture in an oven, wherein the oven is then heated from room temperature to a heating temperature.

8. The method of claim 1, wherein the inert atmosphere is provided by a chemically inert gas comprising $N_2$, Ar, He, or a combination thereof 9. The method of claim 1, further comprising:
   cooling the graphene-based product under an inert atmosphere following the heating step, and
   collecting the graphene-based product.

10. The method of claim 1, wherein the graphene-based product comprises a nano-sheet.

11. The method of claim 1, wherein the graphene-based product has a carbon content of at least about 90% by weight.

12. The method of claim 1, wherein the graphene-based product is formed with more than about 0.1% nitrogen by weight of the total graphene-based product.

13. The method of claim 1, wherein the graphene-based product comprises about 30% or less impurity atomic species by weight of the total graphene-based product.

14. A method of forming a graphene-based product comprising:
- forming a physical mixture by physically mixing graphite oxide with a reductive-expansion agent comprising urea;
- heating the physical mixture in an inert atmosphere at a heating temperature to form a free-standing graphene-based product, wherein the heating temperature is at or above a decomposition temperature of the reductive-expansion agent; and
- cooling the free-standing graphene-based product, wherein the graphene-based product comprises one or more of a single graphene sheet, a stack of two or more single graphene sheets, and entangled single graphene sheets.

15. The method of claim 14, wherein the step of heating the physical mixture comprises placing the physical mixture in a device pre-heated at a heating temperature of about 600° C. or higher.

16. The method of claim 14, wherein the step of heating the physical mixture comprises placing the physical mixture in a device, wherein the device is then heated from room temperature to the heating temperature of about 600° C. or higher for about 30 minutes or less.

17. The method of claim 14, wherein the reduction-expansion agent is a solid, and the heating temperature ranges from about 300° C. to about 800° C.

18. A method of forming free standing graphene comprising:
- forming a physical mixture by physically mixing graphite oxide with a reductive-expansion agent comprising urea;
- heating the physical mixture in an inert atmosphere at a heating temperature to form free standing graphene, wherein the heating temperature is at or above a decomposition temperature of the reductive-expansion agent; and
- cooling the free standing graphene, wherein the free standing graphene comprises graphene sheets.

19. The method of claim 18, wherein heating the physical mixture comprises heating at a temperature of 600° C. or higher.

20. The method of claim 14, wherein the physical mixture comprises a molar ratio of the graphite oxide to the urea, wherein the molar ratio ranges from 1:2 to 1:10.

* * * * *